April 22, 1924.

L. N. HILL

AUTO RIM

Filed Oct. 19, 1922

April 22, 1924.
L. N. HILL
AUTO RIM
Filed Oct. 19, 1922   2 Sheets-Sheet 2
1,491,748
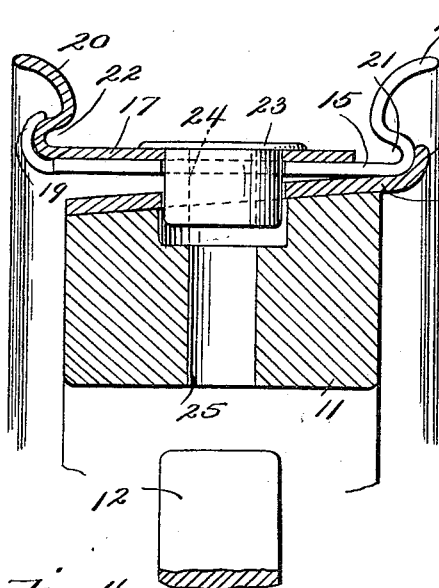
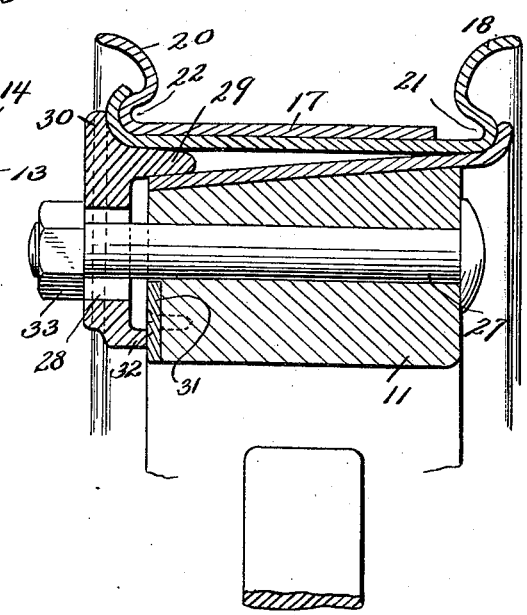
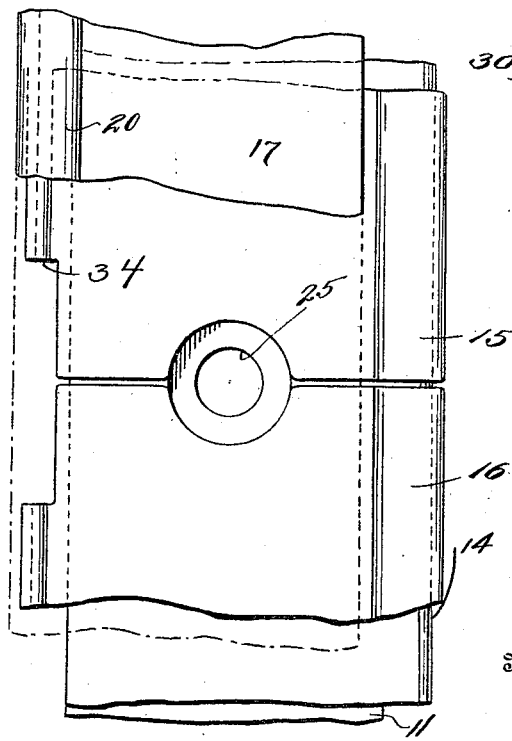
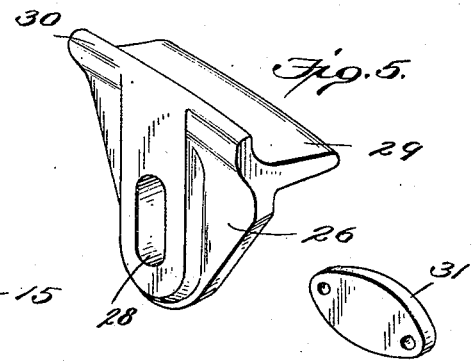
Inventor
Larkin N. Hill Patented Apr. 22, 1924.

1,491,748

UNITED STATES PATENT OFFICE.

LARKIN N. HILL, OF ATLANTA, GEORGIA.

AUTO RIM.

Application filed October 19, 1922. Serial No. 595,612.

*To all whom it may concern:*

Be it known that I, LARKIN N. HILL, a citizen of the United States, residing at Atlanta, in the county of Fulton and State of Georgia, have invented certain new and useful Improvements in Auto Rims, of which the following is a specification.

The present invention relates to vehicle wheels and particularly to the type of wheels having demountable rims.

An object of the invention is to provide a wheel of this character provided with a demountable rim which may be readily attached to the tire and which, together with said tire may be readily slipped onto the felly of a wheel and secured thereto without the employment of tools, except a wrench.

Referring to the drawings:

Figure 2 is a detail section on the line 2—2, Fig. 1 showing on an enlarged scale compared with Figure 1, the application of the rim of my invention to the felly of a wheel.

Figure 3 is a similar view on line 3—3, Figure 1 showing the relation of the parts to the clamp member for holding the rim on the wheel.

Figure 4 is a fragmentary view of the outer side of the abutting ends of the inner rim members showing the relation of the inner rim members to the valve stem enclosing plug; the outer rim being shown as broken away.

Figure 5 shows the holding clamp and the plate against which the clamp rests.

Referring to the drawings by reference numerals, same numerals designating the same parts in all figures of the drawings:

Figure 1:
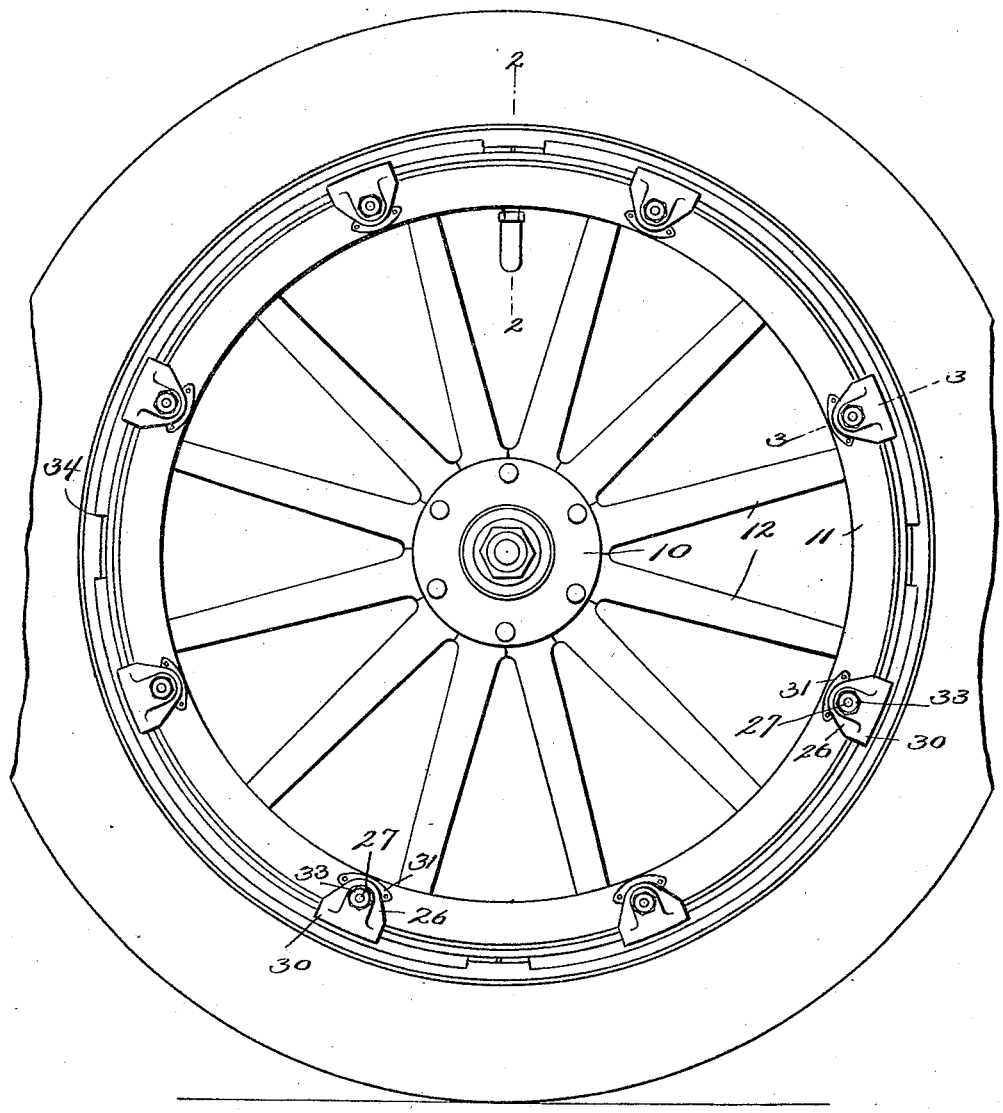
Figure 1 is a side elevation of a wheel with my invention applied thereto.

10 designates the hub of a wheel and 11 designates the felly connected thereto by the spokes 12. The periphery of the felly, as shown in Figure 2, is made with an outwardly converging slope and mounted upon the felly is a wheel band 13 having a slope similar to that of the periphery of the felly and provided at its inner edge with an outturned flange 14. The wheel band is preferably of metal and has for its object to bind the wheel and to afford a smooth contact surface for a purpose which will presently appear.

A feature of my invention is the provision of a rim consisting of three parts made of metal or other suitable material; the three parts being an inner rim made up of two semi-circular halves 15 and 16 and an outer rim 17 consisting of a continuous annular member. The inner rim is provided with flanges 18 and 19 on its respective side edges and the inner member 17 is provided with a flange 20 on one of its edges, the flanges 18 and 20 being constructed so as to provide annular recesses 21 and 22 to receive the flanges on the edges of the tire, and curved upwardly and outwardly to conform with the curvature of the casing and to prevent the presentation of sharp edges against the rubber of said casing. The flanges 19 are preferably cut away at intervals as shown at 34 (Fig. 4) to increase the resiliency of the rim members 15 and 16 and to permit them to readily conform to the shape of the outer rim 17. The outer rim 17 is provided with a plug 23 secured thereto which is centrally apertured at 24 to receive the valve stem and the felly is similarly apertured in alignment with the aperture 25. The inner rim members 15 and 16 are each cut away at one of their ends to surround the said plug and abut thereagainst.

In placing a tire upon the felly of a wheel the operation is as follows; the solid outer rim member 17 is first slipped into place in the tire with one flange of the tire seated in the recess 22 and the two halves 15 and 16 of the inner rim are then placed within the tire with the flange 19 engaging the outwardly projecting bead of the rim member 17 opposite the recess 22 and with the other flange of the tire seated in the recess 21. The tire, together with the parts 15 and 17 in place, may now be slipped upon the felly until the flange 18 abuts against the flange 14 of the wheel band, the slope of which band, as described above, assists in the easy application of the tire thereto. The upper end of the aperture 25 in the felly 11 is countersunk to receive the plug 23 and in placing the tire upon the felly the valve stem which projects through the aperture 24 of the plug 23 is first inserted through the aperture 25 in the usual manner.

When the tire and related parts are in place as above set forth, the said parts are locked in position by means of the clamping members 26 in cooperation with the bolts 27, the clamping members 26 being provided with elongated apertures 28 for the reception of the end of the bolt. The clamping members are provided adjacent their upper edges with wedge members 29 having a curvature conforming with the outer curvature of the band 13 and an upwardly extending flange 30 adapted to abut against the flanges 19 of the inner rim members. Adjacent each clamping member and inset into the felly of the wheel are plates 31 against which projections 32 on said clamping members are adapted to abut. When in proper position the wedge shaped members 29 are drawn between the wheel band 13 and the inner rim members 15 and 16 by tightening the nuts 33 on the bolts 27 forcing the members 15 and 17 into a position in which their transverse lines are at right angles to the diameter of the wheel.

It will be seen from the above description that I have provided a construction whereby the tire may be applied to a wheel without the use of tools except a wrench to engage the nuts 33 and force the clamping members into place. I have also provided a construction whereby simplicity and facility of operation is attained.

What I claim is:—

1. A demountable rim comprising a continuous annular member adapted to rest against the tire and a pair of semi-annular members adapted to rest against said annular member, a flange on one edge of said annular member and flanges on both edges of said semi-annular members, and the annular and semi-annular members having at opposite edges recesses to receive the flanges of a tire.

2. A demountable rim comprising inner and outer rim members, said outer rim member having a flange on one edge and said inner rim member comprising two semi-circular parts having flanges on both edges, one of the flanges on each of the semi-circular members being adapted to grip the flange of the outer rim member.

3. A demountable rim comprising inner and outer rim members, said outer rim member having a flange on one edge and said inner rim member comprising two semi-circular parts having flanges on both edges, one of said flanges being adapted to conform with the surface of the outer rim member.

4. A demountable rim for vehicle wheels, comprising an annular outer member and a pair of semi-circular inner members, said outer annular member having a flange on one edge and the inner members having flanges on both edges, one of the flanges on the inner members being cut away at intervals.

In testimony whereof, I affix my signature in presence of two witnesses.

LARKIN N. HILL.

Witnesses:
T. O. HOWELL,
P. B. HOPKINS.